United States Patent [19]
Piotrowitz

[11] Patent Number: 5,271,118
[45] Date of Patent: Dec. 21, 1993

[54] PLASTIC PACKING RING OR DISK AND A METHOD AND APPARATUS FOR MAKING SAME

[75] Inventor: Juergen Piotrowitz, Lingen, Fed. Rep. of Germany

[73] Assignee: Gerhard Kopp GmbH, Lingen, Fed. Rep. of Germany

[21] Appl. No.: 843,123

[22] Filed: Feb. 28, 1992

[30] Foreign Application Priority Data

Mar. 2, 1991 [DE] Fed. Rep. of Germany ....... 4106699

[51] Int. Cl.⁵ ............................. B08B 9/02; F16J 15/16
[52] U.S. Cl. ............................. 15/104.061; 277/212 F; 277/228; 277/DIG. 6
[58] Field of Search ..................... 15/104.061; 277/165, 277/212 R, 212 C, 212 F, 227, 228, DIG. 6

[56] References Cited

U.S. PATENT DOCUMENTS

| | | | |
|---|---|---|---|
| 2,318,757 | 5/1943 | Christenson | 277/212 C |
| 3,011,197 | 12/1961 | Nehse et al. | 15/104.061 |
| 3,130,976 | 4/1964 | Niswander | 277/227 X |
| 3,164,389 | 1/1965 | Thomas | 277/227 |
| 3,168,320 | 2/1965 | Sneed | 277/227 X |
| 3,181,876 | 5/1965 | Felt | 277/227 X |
| 3,484,886 | 12/1969 | Girard | 15/104.061 |
| 3,725,968 | 4/1973 | Knapp et al. | 15/104.61 |
| 3,825,606 | 4/1975 | Landers | 15/104.61 |
| 3,939,519 | 2/1976 | Muirhead | 15/104.061 |
| 4,494,584 | 1/1985 | Bognoni | 15/104.061 |
| 4,580,794 | 4/1986 | Gibbons | 277/DIG. 6 X |
| 5,004,513 | 4/1991 | Bennis et al. | 277/227 X |
| 5,028,056 | 7/1991 | Bennis et al. | 277/227 |
| 5,035,021 | 7/1991 | LeDevehat | 15/104.061 |

FOREIGN PATENT DOCUMENTS

| | | | |
|---|---|---|---|
| 48707 | 3/1982 | European Pat. Off. | 15/104.061 |
| 2022770 | 12/1979 | United Kingdom | 277/212 C |
| 2219636 | 12/1989 | United Kingdom | 277/165 |

OTHER PUBLICATIONS

"A New Seal: The Uniting"; D. A. Hoffman; Presented to National Conference on Fluid Power, 1975.

*Primary Examiner*—William A. Cuchlinski, Jr.
*Assistant Examiner*—Scott W. Cummings
*Attorney, Agent, or Firm*—Jordan and Hamburg

[57] ABSTRACT

A plastic packing ring or disk for scrapers and other such bodies sliding in pipelines consists essentially of polyurethane and is supported annularly on the inside of the pipe. To make especially this kind of support elements on scrapers more resistant to friction stresses and improve their sliding qualities, the plastic packing rings or disks on the scrapers have embedded particles of solidified polyethylene at least in an outer part intended for contact with the pipeline.

8 Claims, 2 Drawing Sheets

PLASTIC PACKING RING OR DISK AND A METHOD AND APPARATUS FOR MAKING SAME

The invention relates to a plastic packing ring or disk and to an apparatus for the production of a plastic packing ring or disk.

BACKGROUND OF THE INVENTION

It is known to prepare polyurethane plastic packing rings or disks for scrapers and other such bodies for sliding through pipelines, wherein the crosslinking material is cast in a mold which matches as closely as possible the intended final shape, which in the concrete case is the shape of the packing ring or disk. When these plastic packing rings or disks are used as parts of scrapers and other such bodies for sliding through pipelines, the marginal portions of the packing ring or disk are exposed to severe friction, and they constitute a weak point in meeting the stringent requirements relating to the tight fit of these friction surfaces. In the case of scrapers in pipelines, especially in off-shore petroleum drilling operations, however, pipeline lengths of 50 km, 100 km and more have to be traversed in a single draft, which creates extremely stringent requirements to be met by the packing rings and disks. A short useful life in these scraper disks and packing rings thus not only increases reconditioning costs and involves undesirably great material costs, but in some special applications it leads even to the breakdown of the scraper. If the friction resistance at the sliding surfaces is too high, then the amount of power required to move the sliding body is disadvantageous in many applications.

SUMMARY OF THE INVENTION

The invention is addressed to the problem of creating a plastic packing ring or disk which, without increasing its complexity, will be more resistant to friction stresses, achieve long lengths of travel and have improved sliding qualities. It is furthermore addressed to the problem of developing a simple method for the preparation of especially wear-resistant plastic packing rings or disks, and of creating an apparatus which permits the packing rings to be produced in casting molds with little difficulty.

The invention relates to a plastic packing ring or disk which is especially resistant to abrasive stresses, wherein a wear-resistant friction layer is a homogenous component of the packing ring or disk, at least in an outer portion intended for contact with the pipeline. The plastic packing ring or disk in its simplest configuration is made entirely from a polyurethane containing embedded particles of previously treated or solidified polyethylene and are contained as organic lubricant additives, so that in the friction layer formed in the outer portion of the plastic packing ring, a reduced coefficient of friction is brought about when it is sliding on the inside of pipelines, for example, and the plastic packing ring or disk achieves a longer useful life overall. In a special configuration, the packing ring or disk consists of two polyurethane rings merging materially with one another, of which only the outer one is provided with the embedded polyethyene particles through its entire thickness. Thus an effective friction layer is achieved using a material satisfying the requirements, while the good strength characteristics of the product are preserved.

By the method of the invention, two different materials can be cast together in an especially simple manner so that the polyurethane layer provided with embedded particles of a previously treated and solidified polyethylene remains as a friction layer in the outer portion of the plastic packing ring or disk and enters into a material blend with the other, additive-free polyurethane. For this purpose, a casting of the two different polyurethane materials is performed in the same mold, and the polyurethane materials can be charged successively or simultaneously. A zone of bonding between the two polyurethane materials thus created is especially achieved by the fact that the two materials come into contact before the gelling time, so that a partial mixing or crosslinking occurs in an area of transition.

The casting of the two polyurethane materials can be further accelerated by casting both these polyurethane materials simultaneously. In that case, appropriate blocking means are to be disposed in the mold to prevent the immediate mixing of the two polyurethane materials at least while they are being poured. Before the gelling time of the two polyurethane materials is reached, these blocking means are removed, so that then a homogeneous combining of the previously separated phases can take place and an intended final form can be reached.

An advantageous configuration of the plastic packing rings or disks produced in accordance with the invention is achieved if the polyurethane provided with the solidified polyethylene particles is cast around a cured core, which can be formed especially from a worn-out packing ring or disk. In this manner material-saving reconditioning becomes possible and reconditionable packing rings or disks can be manufactured.

With the apparatus for the production of a plastic packing ring or disk in accordance with the invention, the plastic packing ring or disk in final form can be provided by simple means with a wear-resistant friction layer. By placing an insert ring in the cavity of the casting mold the packing ring or disk can be produced in a material-saving and economical manner. Thus the two polyurethanes of different composition can remain separate during the charging of the mold, and can fuse or crosslink together in a transitional area after the insert ring is removed. The insert ring of variable diameter forms two areas in the device, so that thus the friction zone can be given an optimum size in the friction-stressed outer portion. By arranging several insert rings in the mold, plastic packing rings or disks that are wear-resistant on both sides can be created with simple means and can be adapted to different conditions of use.

The details of the invention will be further explained in the following description in conjunction with the drawing representing diagrammatically two embodiments of an apparatus having a configuration in accord with the invention.

DESCRIPTION OF THE PREFERRED EMBODIMENTS

Figure 1:
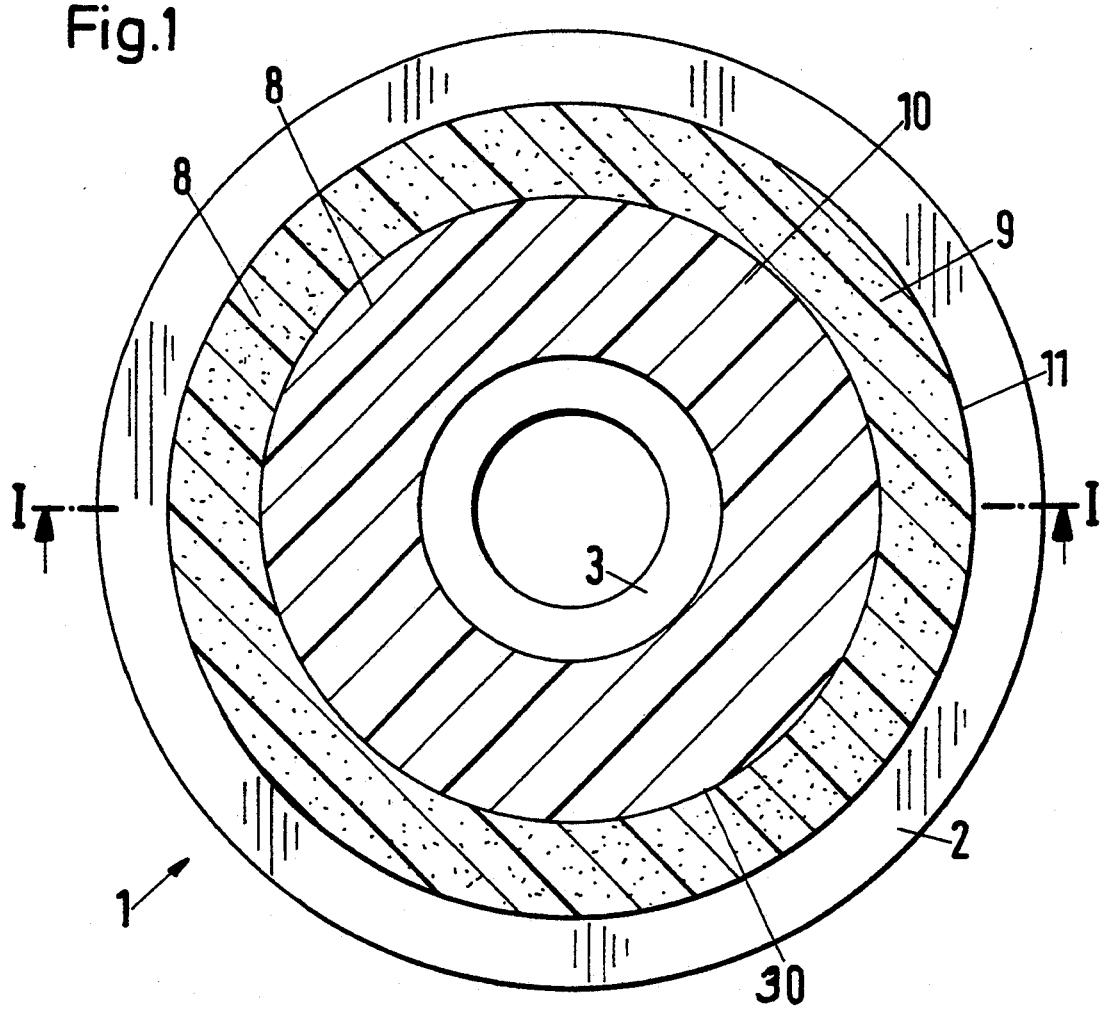
FIG. 1 is a diagrammatic top view of a plastic disk in a casting mold.
Figure 2:
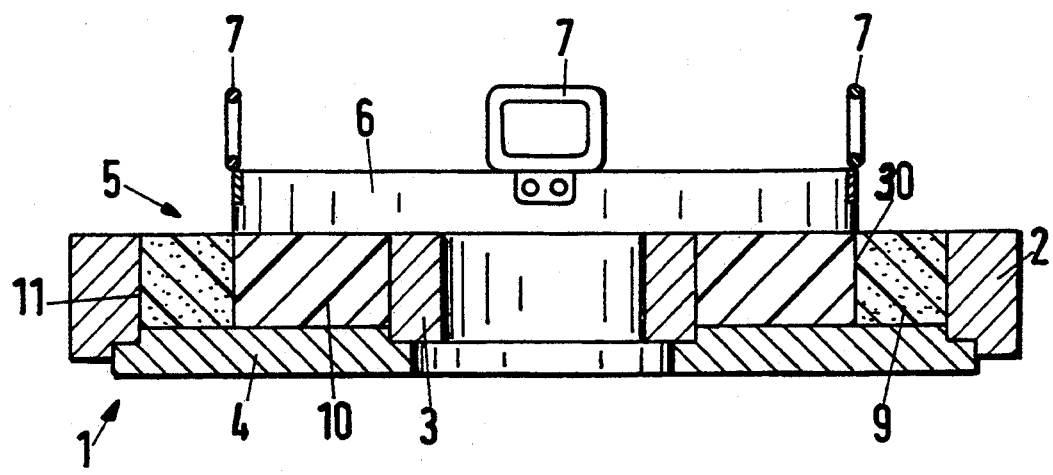
FIG. 2 is a cross-sectional view of an apparatus for casting a plastic disk taken along the line I—I of FIG. 1.

In FIGS. 1 and 2 there is shown a casting mold identified as a whole by 1, which is formed by an outer ring 2 and an inner ring 3 which rest on a common base disk 4 such that an open-topped, leak-proof cavity 5 is formed. For the casting of polyurethane phases an insert ring 6 is placed in this cavity, which when the two polyurethane phases are cast rests on the base disk 4 the same as the outer ring 2 and the inner ring 3. When the insert ring 6 is raised it no longer acts as a dam.

The insert ring 6 is provided with handles 7 enabling it to be raised vertically.

In its simplest embodiment, a plastic disk 8 is cast in the cavity 5 formed by the outer ring 2 and the inner ring 3 and serves as the annular element for the support of a scraper moving in a pipe. This plastic disk 8 is composed of an outer portion 9 and an inner portion 10. In a concrete embodiment the outer portion 9 is an area consisting of polyurethane containing embedded particles of solidified polyethylene, while the inner portion 10 consists of polyurethane with no substances added. A plastic disk 8 thus formed therefore has at its outer margin 9 a circumferential friction layer 11 whose resistance to wear and friction properties are decidedly influenced by the embedded particles of solidified polyethylene. In a transitional area 30 formed between the outer portion 9 and the inner portion 10 after the insert ring 6 is removed the two different polyurethane materials mix together, so that homogeneous plastic disk 8 is removable from the casting mold 1. The homogeneous plastic disk 8 is thereby formed as a hardened, single, integral circular element structure. The embedded particles of solidified polyethylene have a grain size of from 100 to 500 micrometers and are admixed with the polyurethane material in an amount of from 10 to 30 percent by volume. The particles comprise polyethylene of ultra-high molecular weight which are surface solidified by oxidation.

Figure 3:
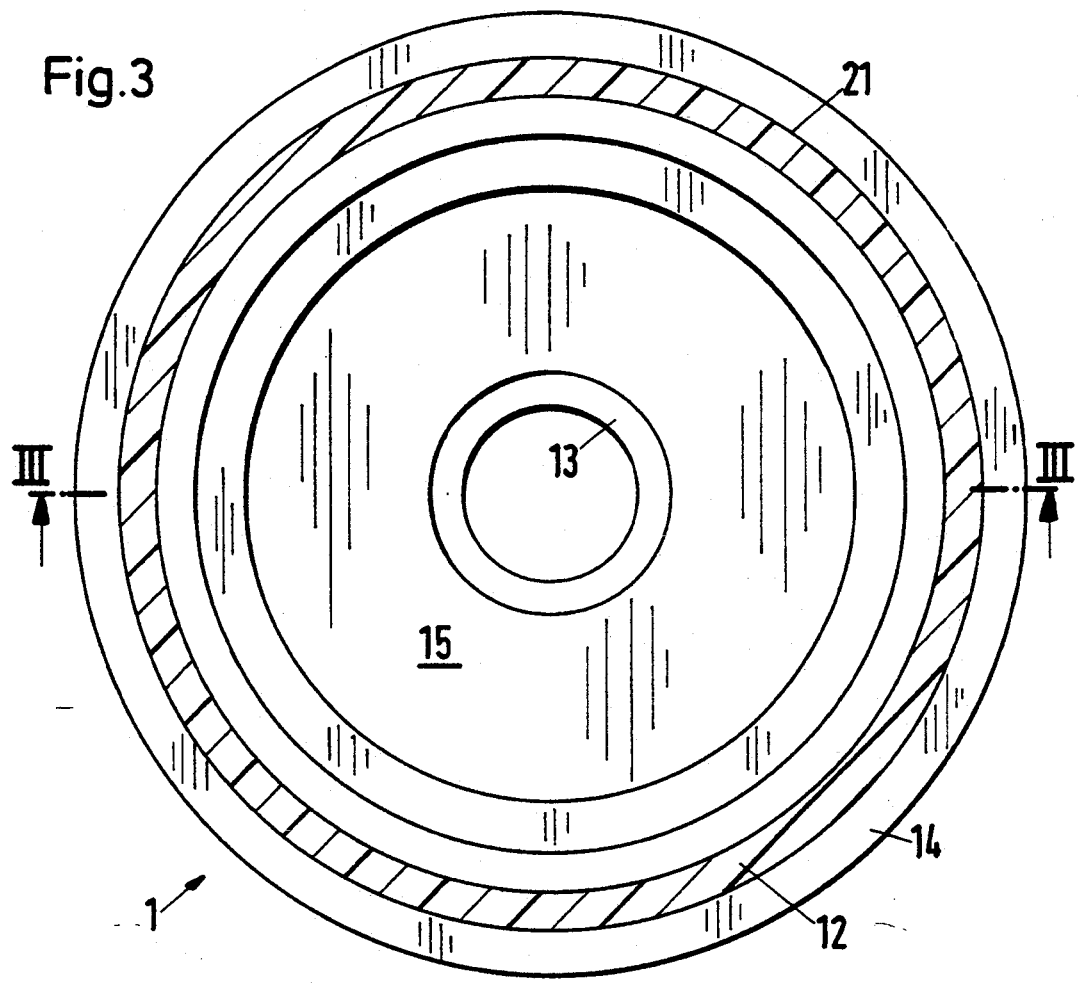
FIG. 3 is a plan view of a plastic packing ring in a casting mold.
Figure 4:
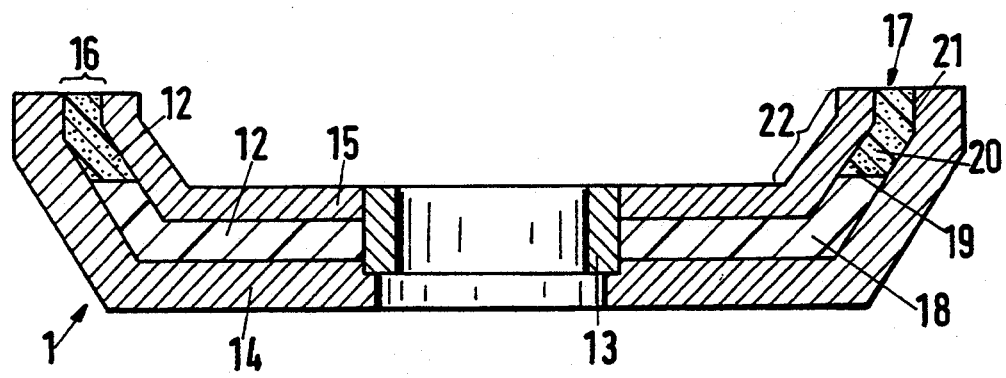
FIG. 4 is a section through the plastic packing ring taken along the line III—III in FIG. 3.

FIGS. 3 and 4 show a casting mold 1 for the production of a plastic packing ring 12. A horizontal mold disk 14 as well as a horizontal top disk 15 are in contact with an inner ring 13 of the mold 1. The plastic packing ring 13 is shaped in a dish-shaped cavity 16 by placing the different polyurethane materials in this cavity between the mold disk 14 and the top disk 15. In the embodiment represented, the polyurethane without the additive is poured first through an opening 17 and forms an inner portion 18, and then the polyurethane with surface-solidified polyethylene particles added is poured in by gravity. With no additional blocking means to prevent the complete intermixing of the two polyurethane phases, the pouring surface forms a division, which if desired can be performed in a similar structure by a vertical or horizontal dividing disk (not shown). Since in the embodiment represented, the polyurethane that was first poured in has not yet reached its gelling point, a transition area 19 forms at the contact surface between the two polyurethane phases and thus an overall homogeneous plastic packing ring 12 is formed, which for use in a pipeline has improved strength characteristics in an outer portion 20, whose friction surface 21 lies reliably against the pipeline, since the plastic packing ring 12 is provided with a reflexed portion 22 that produces a bias.

In an embodiment (not represented) in which the inner ring 13 is at least partially removed or provided with injection holes, a simultaneous pouring of the polyurethane materials between the horizontal mold disk 14 and the horizontal top disk 15 is possible, so that the productivity of the production of such plastic packing rings can be further improved.

What I claim is:

1. A plastic circular element for use with bodies which are made to slide in an elongated pipe line of a plurality of kilometers in length and in which said bodies are subjected to severe friction conditions upon contacting the inner surface of the pipe line while traversing the length of said pipe line, said plastic circular element comprising a circular body having an inner radial strength-enhancing portion made of polyurethane and an outer radial wear-resistant portion made of polyurethane, said inner radial portion of polyurethane and said outer radial portion of polyurethane being joined to one another by fusing and cross-linking of the polyurethane of said inner and outer radial portions to thereby form a single, integral circular element structure, said outer radial portion having an outer peripheral surface operable to slidably contact the inner cylindrical surface of said pipe line as said body is made to traverse the longitudinal extent of the pipe line, said outer radial portion having embedded particles of solidified polyethylene, said particles having a grain size of from 100 to 500 micrometers and being admixed with said polyurethane material in an amount of from 20 to 30% by volume, said particles in said outer radial portion providing enhanced wear resistance and enhanced friction reduction while being resistant to abrasive stresses as said outer radial portion slidably engages the inside of said pipe line upon said body being made to slide through the pipe line, said inner radial portion being devoid of said polyethylene particles and thereby providing enhanced strength to the single, integral circular element structure.

2. A plastic circular element according to claim 1 wherein said particles are surface solidified by oxidation.

3. A plastic circular element according to claim 1 wherein said inner and outer radial portions which are joined to one another by fusing and cross-linking of the polyurethane form a single homogeneous and integral circular element structure.

4. A plastic circular element according to claim 1, wherein said outer radial wear-resistant portion has an annular configuration having a substantially constant radial thickness throughout its annular extent.

5. A plastic circular element according to claim 4, wherein said particles are embedded throughout said radial thickness of said outer radial wear-resistant portion.

6. A plastic circular element according to claim 1, wherein said circular element has an axis, said inner and outer radial portions being axially displaced form one another.

7. A plastic circular element according to claim 1, wherein said circular element has an axis, said circular element having an inner section and an outer section, said inner section being generally perpendicular to said axis, said outer section being disposed radially outwardly of said inner section, said outer section extending generally non-perpendicular to said axis and being axially displaced from said inner section, said outer section having said outer peripheral surface which slidably contacts the inner cylindrical surface of the pipe line.

8. A plastic circular element for use with bodies which are made to slide in an elongated pipe line used in off-shore petroleum drilling operations and in which said bodies are subjected to severe friction stress conditions upon contacting the inner surface of the pipe line while traversing said pipe line, said plastic circular element comprising a circular body having an inner radial strength-enhancing portion made of polyurethane and an outer radial wear-resistant portion made of polyurethane, fusing means between said inner radial portion of polyurethane and said outer radial portion of polyurethane joining said inner and outer radial portions to one another by fusing and cross-linking of the polyurethane of said inner and outer radial portions to thereby form a hardened, single integral circular element structure, said outer radial portion having an outer peripheral surface operable to slidably contact the inner cylindrical surface of said pipe line as said body is made to traverse the longitudinal extent of the pipe line, said outer radial portion having embedded particles of solidified polyethylene, said particles having a grain size of from 100 to 500 micrometers and being admixed with said polyurethane material in an amount of from 20 to 30% by volume, said particles in said outer radial portion providing enhanced wear-resistance and enhanced friction reduction as said outer radial portion slidably engages the inside of the pipe line upon said body being made to slide through the pipe line, said inner radial portion being devoid of said polyethylene particles and thereby providing enhanced strength to the hardened, single, integral circular element structure.

* * * * *